UNITED STATES PATENT OFFICE.

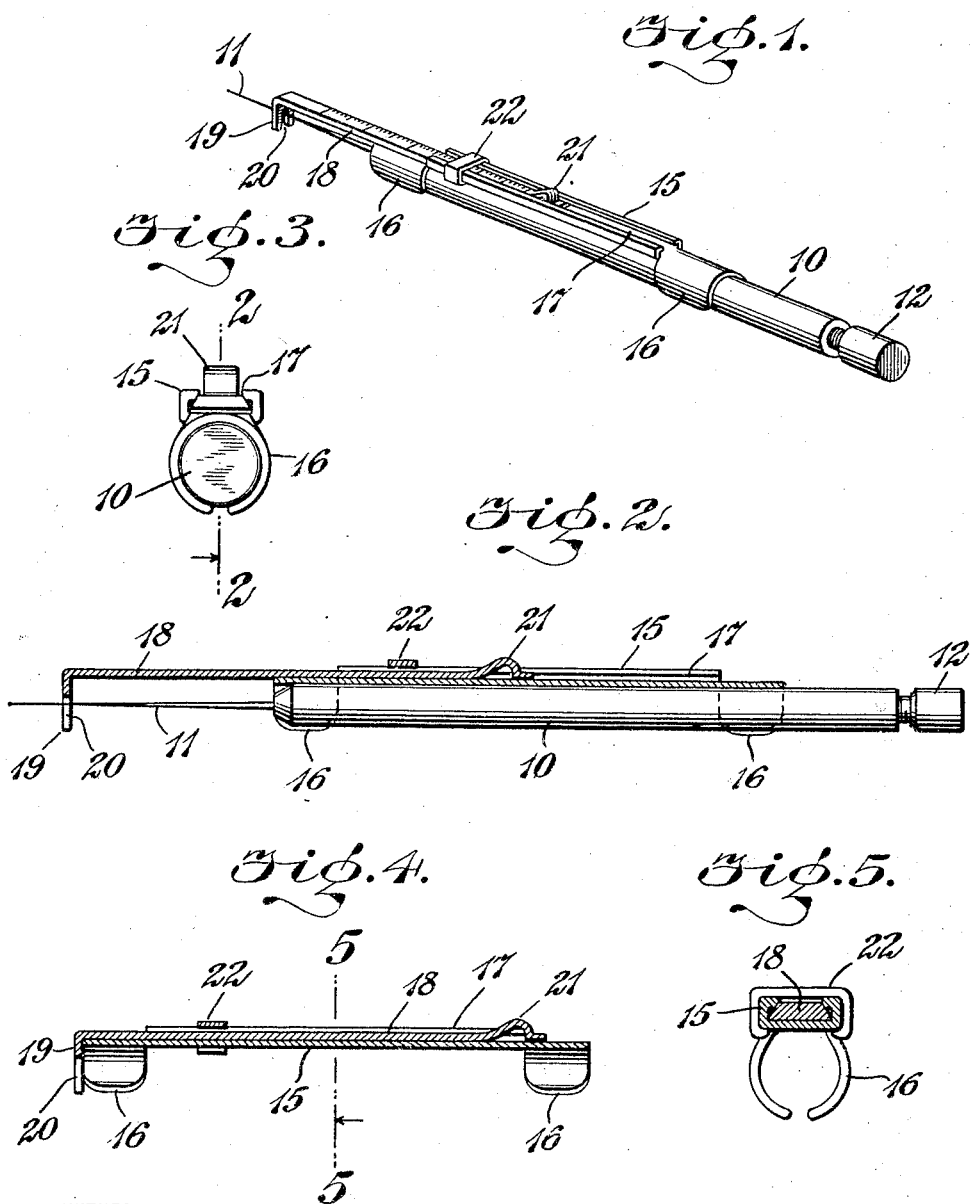

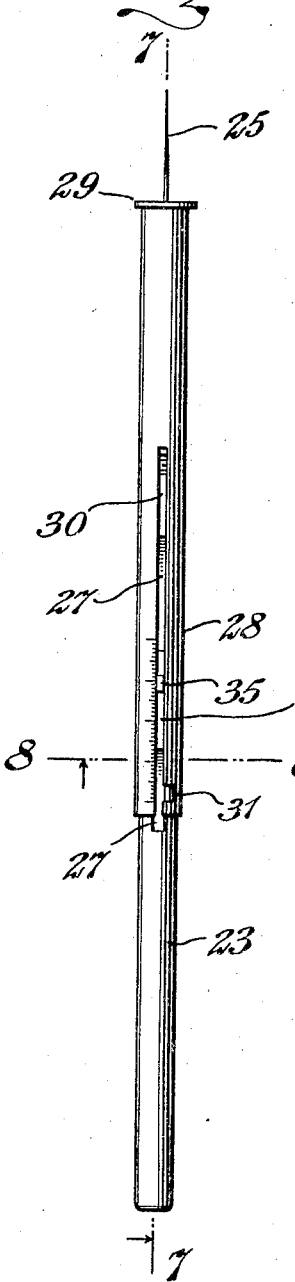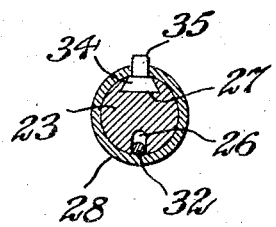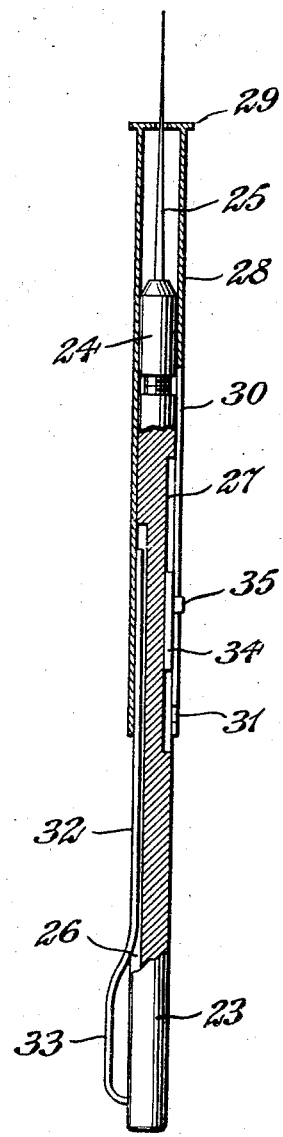

MEYER L. RHEIN, OF NEW YORK, N. Y.

GAGE FOR DENTAL AND SURGICAL INSTRUMENTS.

1,327,114.

Specification of Letters Patent. Patented Jan. 6, 1920.

Application filed October 16, 1915. Serial No. 56,310.

*To all whom it may concern:*

Be it known that I, MEYER L. RHEIN, a citizen of the United States, residing at the city of New York, borough of Manhattan, county and State of New York, have invented a certain new and useful Gage for Dental and Surgical Instruments, of which the following is a specification.

In certain kinds of dental work, it is important for the operator to determine accurately the length of a root canal within a tooth, or in other words, the length of a root canal from the end thereof to the surface of the tooth. Similarly, in surgical work it is a matter of importance to determine the location of a foreign body or obstruction.

In removing the pulps of teeth, dentists encounter great difficulty in reaching the ends of roots by reason of the curvatures of such roots and by reason, also, of pathologic obstructions in the pulp itself. It is essential in this important dental surgical work that the operator should be able to reach the extreme end of the pulp canal, *i. e.* at the point where it enters the root, but as the progress is quite slow when obstructions are met with, it is frequently the case that the dentist is unable to determine whether or not the work is progressing to the end of the root, hence it becomes a matter of great importance that some means be provided whereby the operator is enabled to determine with precision the exact increase in the length of the root canal toward which the work is progressing. Furthermore, in the construction of artificial crowns, for use individually or to serve as supports for bridge work over the roots of teeth, it is highly desirable to determine how long a dowel should be for use in a root canal, and, accordingly, an instrument for determining the length of a dowel for such purposes possesses utility in the art pertaining to dentistry.

So far as I am aware, no provision has been made heretofore in either dental instruments or surgical instruments whereby the depth may be determined with precision. Accordingly, the main purpose of this invention is to provide a depth gage, the same being either a permanent part of the instrument or it may be attachable to different instruments. In a broad aspect, the depth gage of this invention can be employed in connection with dental instruments and with surgical instruments, but in this application I will disclose two forms of the depth gage as parts of a dental broach, drill, cleanser, probe, or reamer, one of said forms being attachable to different dental devices of the classes stated, whereas in the other form the depth gage is an integral part of the dental instrument.

Broadly stated, the invention embodies a member carried by or attachable to a handle of the instrument, a second member movable with respect to the first member, said second member coöperating with a part of the instrument for movement toward or from the extremity thereof, and indicating means of one form or another whereby the distance intervening between the second member and the extremity of the instrument may be readily ascertained to the end that the operator may determine with precision the length of a root canal in a tooth or the location of a foreign body or obstruction according as the depth gage is used on a dental instrument or on a surgical instrument.

It has been stated that the depth gage may be in the form of an attachment suitable for use on different instruments of the same kind, such as holders for dental broaches, drills, cleansers, etc., whereas in another embodiment of the invention the depth gage may be constructed as an integral part of the broach holder, etc.

In the attachable and detachable form of the depth gage, one member is provided with means, such as clips, for frictional contact with the handle of the instrument, said member being provided with a guideway for slidably receiving the second member. Said slidable second member is equipped with a part forming the gage proper, the same being positioned for sliding movement relatively to the instrument itself, whereby upon the introduction of said instrument into the canal or cavity the gage is adapted for contact with the surface of the tooth or root of the tooth, using some marked anatomical point as a resting place, if necessary, cutting a spot on the surface on which the gage should always rest in the taking of the measurement.

In the other form of the invention wherein the gage is integral with the instrument, a sleeve is employed as the movable member, said sleeve being positioned for sliding movement relative to the handle of the instrument. Said sleeve is furnished with a gage adapted for contact with the surface of the tooth or root of the tooth, and with the sleeve coöperates retaining means in the form of a spring, the latter being preferably inserted in a groove of the handle so as to be capable of frictional contact with the sleeve.

Provision is made for calibrating the instrument according to a desired standard of measurement, and, accordingly, the sliding member is provided with a suitable scale graduated in millimeters, or in inches and fractions thereof. As is well known, the broaches, drills, cleansers, probes and reamers vary in length, and in order to compensate for this variation the indicating means may, and preferably does, embody a shiftable index adapted for movement initially with the sliding member so as to position the index at a certain point from the extremity of the instrument irrespective of the length of the latter, after which the sliding member is used in connection with the instrument as heretofore stated to ascertain the length of the canal or cavity, i. e., the broach or like device is introduced into the canal or cavity and the gage is shifted with the sliding member so as to contact with the surface of the tooth at a predetermined point, the graduated scale being read from the index so as to ascertain the depth with accuracy and facility, the scale and the index thus affording a direct reading.

Other features and advantages of the invention will appear from the following detailed description taken in connection with the drawings, wherein—

Figure 1 is a perspective view showing the gage applied to an ordinary dental instrument of the kind known as a broach holder.

Fig. 2 is a longitudinal section on the line 2—2 of Fig. 3, the broach holder being shown in elevation.

Fig. 3 is an end view looking toward the handle end of the instrument.

Fig. 4 is a longitudinal section through the gage adapted to be attached to the instrument.

Fig. 5 is a cross section on the line 5—5 of Fig. 4.

Fig. 6 is an elevation of the invention embodied in a dental instrument as a permanent part thereof.

Fig. 7 is a longitudinal section on the line 7—7 of Fig. 6.

Fig. 8 is a cross section on the line 8—8 of Fig. 6.

I will first describe the gage shown in Figs. 1 to 5 inclusive, wherein said gage is made separate from a dental instrument and is adapted to be attached thereto. The instrument shown is of the kind known as a broach, the same comprising a holder 10 and the broach 11. In the form shown the handle is provided with a longitudinal passage through which extends the broach so as to be engaged by a binding screw 12, thus making provision for the use of different instruments in connection with one handle. It is apparent, however, that the gage may be used on different kinds of dental broaches and other instruments.

The gage embodies in its construction a member 15 provided with clips 16 adapted for frictional engagement with the handle 10 of the dental instrument. Said member 15 extends lengthwise of the instrument to which it is externally applied, and in the form shown said member 15 is provided with a longitudinal guideway 17. Said guideway may be of any desired form in cross section in order to slidably receive the movable member 18. This movable member is provided at one end thereof with a part 19 performing the functions of a gage proper, said member 19 being shown in Fig. 1 as having a transverse slot which opens through one edge of the gage whereby the part 19 is adapted to be slipped in a sidewise direction upon the broach, drill, or other dental instrument. The member 18 is in the form of a bar adapted to slide longitudinally within the guideway of the member 15, and as shown this bar is graduated according to any desired standard of measurement so that the graduations serve as a scale to indicate the distance of the gage 19 from the extremity of the broach, drill, or other instrument, whereby the gage will indicate the length of the canal in the tooth.

Suitable means are provided for retaining the sliding bar 18 and the gage 19 in the positions to which they may be adjusted, and, although various forms of retaining means may be utilized, it is preferred to form the end of the bar 18 with a clamp 21, the latter being adapted for frictional contact with the member 15 and with the guideway 17 thereon. The spring of the clamp in frictional contact with the guideway holds the member 18 and gage 19 from movement relative to the member 15, but by pressing with the finger upon the clamp 21 the sliding bar 18 is released so that the bar and the gage may be adjusted as required.

In the simple form of the attachable gage it is applied readily to any ordinary dental broach holder, the application of the gage to the instrument being effected by the frictional engagement of the clip 16 with the handle 10. When it is desired to use the gage, the broach, drill, or other instrument is inserted into the tooth and by operating the clamp 21 the bar 18 is moved lengthwise of the member 15 until the gage 19 contacts with the surface of the tooth or root of the tooth, or with any suitable indicating point thereon. The distance of the gage from the extremity of the instrument indicates the length of the canal in the tooth, the graduated scale of the bar 18 being read with reference to the end of the guideway 17.

As the dental broach, drill, or other instrument may vary in length beyond the handle 10, I have found it desirable to provide a shifting indicator adapted to be initially positioned on the member 15 when the gage is first applied to the dental instrument in order to subsequently determine the reading of the scale when the gage is in use to ascertain the length of a canal in the tooth. This shiftable indicator is shown more particularly in Figs. 4 and 5 as a clip 22, the ends of which embrace the member 15, whereby the clip is adapted to hold itself in position upon the member 15 by frictional contact therewith. The shiftable indicator forms a point from which the graduated scale on the member 18 may be read so as to afford a direct reading. The gage device when applied to the handle of the instrument is first used to determine the position which the indicator 22 is to occupy upon the member 15. This is done by sliding the member 18 in the guideway 17 until the gage member 19 is flush with the extremity of the broach, drill, or the like, and thereafter the indicator 22 is shifted to the zero point on the scale of the member 18, said indicator 22 being slidable freely along the member 15. The instrument is now used in the ordinary way but the slide 18 and the gage 19 are drawn toward the handle of the instrument until the gage 19 is in contact with the tooth or the identification point thereon, the extent of movement of the slide 18 and gage 19 being readily ascertained by reading the graduated scale from the indicator 22.

The invention is embodied as a permanent part of the instrument in the manner shown in Figs. 6, 7 and 8, the handle 23 being provided with a clamp 24 for retaining the broach, drill, or other instrument 25 in fixed relation to said handle, although it is apparent that the broach, drill or other device may be rigidly attached in any other desired way to said handle. The handle is constructed with two longitudinal slots or grooves 26, 27, the groove 26 exceeding in length the groove 27. The movable part of the instrument is a sleeve 28 adapted to slide freely over the handle 23 and to more or less incase the slots or grooves 26, 27 of said handle. The sleeve is provided at one end with a part 29 adapted to serve as the gage proper by contacting with the surface of the tooth, or root of the tooth, and in addition to this member 29 said sleeve is provided with a slot 30 which is offset near one end, as at 31. The sleeve 28 is held in any one of several operative positions by a friction spring 32 which extends lengthwise within the long groove 26, one end portion of said spring being bent or offset at 33 and attached in any suitable way to the handle 23, whereby the spring 32 is positioned loosely within the groove 26 for frictional contact with the inner surface of the sliding tubular member 28.

34 is a shiftable indicator slidably fitted within the short groove 27 of the handle, said indicator being provided with a projecting part 35 which projects through the slot 30 and is adapted to slide therein. The tubular member 28 is provided with a scale graduated according to any suitable standard of measurement, and with this scale cooperates the protruding part 35 of the indicator 34, so that the position of the gage 29 on the sliding sleeve 28 will be readily ascertained by reference to the scale which affords a direct reading of the distance between said gage 29 and the extremity of the dental instrument. The instrument of Figs. 6 to 8, inclusive, is adapted to be manipulated by one hand, thus obviating the necessity for using one hand to insert the instrument and another hand to adjust the gage for ascertaining the length of the canal in the tooth. After the broach or drill shall have been attached to the handle, the tubular member or sleeve 28 is slipped over the handle, so that the gage 29 is substantially flush with the extremity of the drill, broach, etc., at which time the spring 32 is in contact with the sleeve 28, said sleeve having been previously rotated for the projecting part 35 of the indicator to engage with the offset 31 in the slot 30, whereby the sleeve and the indicator are connected for the indicator to move along the groove 27 simultaneously with the movement of the sleeve 28 lengthwise of the handle 23. The indicator 35 is thus set to a position on the handle corresponding with the length of the instrument attached to said handle, and thereafter the sleeve 28 is rotated so as to position the protruding part 35 of the indicator in the slot 30 of the sleeve. By pressing on the spring 32 the frictional contact of the spring with the sleeve is removed and the sleeve can then be moved lengthwise of the handle to any desired position, after which the pressure on the spring is removed in order that the spring may retain the sleeve 28 in the adjusted position.

In using the instrument of Figs. 6 to 8, inclusive, the indicator 35 is first adjusted, as heretofore described, and when the instrument is inserted into the tooth, the spring 32 is released to allow the sleeve to move freely along the handle until the gage 29 contacts with the surface of the tooth or root of the tooth, or other indicating point thereon, after which the pressure on the spring is relaxed so that when the instrument is withdrawn the operator can determine by reading the scale with reference to the part 35 just the length of the canal in the tooth.

The operation and advantages of the invention will be readily understood from the description taken in connection with the drawings.

Having thus fully described the invention, what I claim as new, and desire to secure by Letters Patent is:

1. The combination with a holder provided with means whereby instruments may be used interchangeably therewith, of a gage movable relatively to the instrument, means for mounting the gage on the holder, indicating means whereby the distance intervening between the gage and the extremity of the instrument may be ascertained, and a member movable relatively to said gage and to the indicating means for determining the initial position of the gage with respect to an instrument.

2. The combination with a holder provided with means whereby instruments may be used interchangeably therewith, of a member movable relatively to said instrument, said member being provided with a part adapted for contact with the surface of a subject under examination or treatment, indicating means controllable by the movement of the member for affording a measurement of the space between the contacting part and the extremity of the instrument, and a second member movable relatively to the indicating means for determining the initial position of the gage with respect to the extremity of an instrument.

3. The combination with a holder having means whereby instruments varying in length may be used therewith, of a member slidable with respect to said holder, said member being provided with a gage positioned for contact with the surface of a tooth or root of a tooth under treatment, means for indicating the distance between said gage and the extremity of the instrument, and a second member movable relatively to the indicating means for determining the initial position of the gage with respect to the extremity of an instrument.

4. The combination with a holder having means whereby instruments varying in length may be used therewith, of a member slidable with respect to said holder, said member being provided with a gage positioned for contact with the surface of a part under treatment, means for mounting said member for slidable movement relatively to said holder, said member having indicating means for affording a measurement of the distance between the gage and the extremity of said instrument, and a second member movable relatively to the indicating means for determining the initial position of the gage with respect to the extremity of an instrument.

5. The combination with a holder having means whereby instruments varying in length may be used therewith, of a member provided with a gage, means for frictionally retaining said member in different positions to which it is adapted to be adjusted relatively to the instrument, said member having indicating means, and a second member movable relatively to the indicating means for determining the initial position of the gage with respect to the extremity of an instrument.

6. A depth gage for dental instruments embodying a member provided with a graduated part and with a gage adapted for contact with a subject the depth of an opening in which is to be ascertained, means for holding a dental instrument and for slidably supporting said first member and the gage thereof whereby said member is operable relatively to the instrument, and a second member movable relatively to the graduated part of the first member and affording means for obtaining a direct reading by aid of the graduated part.

7. A depth gage for dental instruments embodying a holder for said dental instrument, a member provided with a gage adapted for surface contact, means whereby said member and the gage thereof are slidable relatively to the instrument adapted to be held in said holder, said first member being provided with indicating means, and a second member the position of which is shifted by the sliding movement of the first member, said second member being slidable relatively to the indicating means of the first member to afford means for a direct reading by aid of said indicating means.

8. The combination with a holder of a member, means whereby said member is supported on the holder for bodily sliding movement directly on said holder, one of said parts being provided with indicating means, an instrument held by said holder and a gage unitary with said sliding member and positioned for surface contact, said gage being movable with the sliding member relatively to said instrument.

In testimony whereof I have signed my name to this specification.

MEYER L. RHEIN.